United States Patent [19]

Iri et al.

[11] Patent Number: 5,272,223
[45] Date of Patent: Dec. 21, 1993

[54] COMPOSITE METAL POWDER COMPOSITION AND METHOD OF MANUFACTURING SAME

[75] Inventors: Kiyoshi Iri, Nishiibaraki; Mikio Suzuki, Mito, both of Japan

[73] Assignee: Asahi Kasei Metals Limited, Tokyo, Japan

[21] Appl. No.: 867,195

[22] PCT Filed: Apr. 3, 1991

[86] PCT No.: PCT/JP91/00445
§ 371 Date: Jun. 25, 1992
§ 102(e) Date: Jun. 25, 1992

[87] PCT Pub. No.: WO92/17301
PCT Pub. Date: Oct. 15, 1992

[51] Int. Cl.$^5$ .............................. C08L 75/00
[52] U.S. Cl. ..................... 525/452; 525/453; 525/454; 525/460; 528/55; 528/56; 528/72; 427/216; 427/302; 427/327; 427/340; 427/388.1; 427/388.2; 428/403; 428/407
[58] Field of Search ............... 525/452, 453, 454, 460; 528/55, 56, 72; 427/216, 302, 327, 340, 388.1, 388.2; 428/403, 407

[56] References Cited

U.S. PATENT DOCUMENTS 3,964,939  6/1976  Chandross et al. ............... 148/105

FOREIGN PATENT DOCUMENTS 61-39508    2/1986  Japan .
61-291662  12/1986  Japan .
1-57152    12/1989  Japan .

OTHER PUBLICATIONS

International Search Report.

*Primary Examiner*—Maurice J. Welsh
*Attorney, Agent, or Firm*—Finnegan, Henderson, Farabow, Garrett & Dunner

[57] ABSTRACT

A composite metal powder composition according to the present invention is a composition containing composite metal powder obtained in such a manner that an isocyanate compound is chemically bonded to the surface of surface-treated metal particles and a phosphorus compound is further chemically bonded to the isocyanate compound through an urethane bond and can be used as an excellent pigment for an aqueous paint. Further, the present invention simultaneously discloses a method of manufacturing the composite metal powder composition 23 Claims, No Drawings

COMPOSITE METAL POWDER COMPOSITION AND METHOD OF MANUFACTURING SAME

TECHNICAL FIELD

The present invention relates to a composite metal powder composition very useful as a metal powder pigment component for a high grade metallic paint suitable for coating of automobiles, electric home appliances and the like. More specifically, the present invention relates to a novel composite metal powder composition having excellent performance in various characteristics as a pigment component for an aqueous metallic paint.

BACKGROUND ART

Recently, aqueous paints containing only a very small amount of organic solvent or no organic solvent have been increasingly used in the field of paints to save resources and prevent environmental pollution.

Further, a high grade finish which has been conventionally achieved only with a solvent type paint can be achieved with an aqueous paint due to the remarkable technical development of resins for aqueous paints. In a metallic paint containing various metal powder pigments such as an aluminium pigment, however, very few examples of aqueous paints can be practically used. In particular, no example of practically applicable aqueous paints can be found in a metallic paints which can be used for the coating of automobiles and electrical home appliances which require a high grade finish of a coated film and high durability thereof.

One of the reasons of the above mentioned disadvantage is that various metal powder pigments including the aluminium pigment ar liable to erosion in aqueous paints. In particular, when metal powder exists in aqueous paints, metal erosion is caused by water in a pH range of from acidity to basicity based on the nature of various metals, and hydrogen gas is generated accordingly. The hydrogen gas generation is a very serious problem in the paint making process of paint manufacturers and in a coating process used by manufacturers of automobiles and electrical home appliances from the view point of safety. Note that references to the storge stbility of the metal powder pigment in this specification and appended claims pertain to both the erosiveness of a metal powder pigment in an aqueous paint and the erosiveness of a metal powder pigment when it is independently stored without being prepared as a paint.

Although many inventions have been disclosed up to now to improve this storage stability, no practically applicable technologies have been yet established. For example, in order to improve the storage stability of a metallic powder pigment, a method of using a wetting agent such as polyamide, aliphatic amide, fluorine, silicone and the like, is disclosed in U.S. Pat. No. 3,893,254, a method of using a perfluoroalkyl type wetting agent is disclosed in U.S. Pat. No. 3,926,874, and a method of using a fatty acid or a fatty acid alkanol amide with a nonionic wetting agent is disclosed in U.S. Pat. No. 4,138,270. None of these methods, however, exhibits a sufficient effect for improving the storage stability. Furthremore, such methods have a problem in that the metal powder pigment shows a poor wetting property with water.

Further, a method of using caprolactone phosphoric acid ester is disclosed in Japanese Patent Application Kokai (Laid-Open) No. Sho 61 (1986)-298072 for the purpose of improving storage stability by restricting the reaction of a metal powder pigment with water. A method of using octylphenyl dihydrogen phosphate and diethylamine adduct of bis(octylphenyl) hydrogen phosphate is disclosed in Japanese Patent Application Kokai No. Sho 60 (1985)-15466 for the same purpose. A method of using a reaction product of orthophosphoric acid or phosphoric acid monoester with an epoxy compound in an aqueous paint is disclosed in Japanese Patent Application Kokai No. Sho 61 (1986)-47771. A method of using a reaction product of styrene allyl alcohol copolymer, p-tert-amylphenol with orthophosphoric acid or phosphorus pentaoxide as an aqueous paint is disclosed in Japanese Patent Application Kokai No. Sho 61 (1986)-291662. None of these methods, however, can be practically applied because they do not show sufficient improvement. The storage stability provided by these methods is not sufficient when stored in the form of a metal powder pigment as only a relatively small improvement can be observed, and the metal powder pigment which can be stored only in the form of a paint by such methods.

The applicant herein discloses a very effective method of restricting the erosive reaction of the metal powder pigment with water by using a specific organic phosphoric acid ester disclosed in Japanese Patent Kokoku (Post Exam. Publication) No. Sho 60 (1985)-8057. However, it is found that when the compound disclosed in that document is used in a metal powder pigment which is applied to an aqueous paint, in particular, to an aqueous metallic paint used for the facing of automobiles and electric home appliances, the performance of the resultant coated film cannot always meet all the required characteristics. One of the reasons of the above is that, as the application fields of aqueous paints expands, the level of the requirements from the users become more demanding. The following two aspects would be the cause behind such a demand. First, a finished appearance which is equal or superior to that obtained by a solvent type paint, which has been conventionally impossible, becomes possible even with an aqueous paint as mentioned above; and second, the aqueous paint is to be a most-likely candidate capable of meeting social requirements such as regulation on the use of solvent and saving of resources. In particular, there exist a strong demand for replacing high grade finish solvent type metallic paints, which have a very high content of organic solvent therein, with aqueous metallic paint.

DISCLOSURE OF THE INVENTION

An object of the present invention is to provide a novel metal powder composition which can achieve excellent storage stability and a coated film performance equal or superior to that obtained by a solvent type paint even if the metal powder composition is applied to an aqueous paint whose pH is within a strongly acidic range or a strongly basic range.

The above problem can be solved by coating the surface of a metal powder pigment with a reaction product of an isocyanate compound with a phosphorus compound.

That is, the present invention relates to a composite metal powder composition, which comprises surface-treated metal particles having an isocyanate compound chemically bonded to the surface thereof; the isocyanate compound being bonded with a phosphorus compound through an urethane bonding and a method of manufacturing the composite metal powder composition, which comprises reacting an isocyanate compound having at least two or more isocyanate groups and a phosphorus compound having at least one or more P—OH groups with surface-treated metal particles in an inactive solvent and coating the surface of the metal particles with the reaction product of the isocyanate compound with phosphorus compound.

The present invention provides a novel composite metal powder composition which exhibits excellent storage stability and coating performance equal or superior to a solvent type paint even if the composition is applied as a pigment component to an aqueous paint with a pH in a strongly acidic or basic range.

BEST MODE OF CARRYING OUT THE INVENTION

The present invention will be described below in more detail.

Metal particles used in the present invention include metals having relatively high malleability such as aluminium, copper, zinc, brass, and the like, or the alloy thereof mixed with one or two kinds or more thereof.

These metal particles are generally milled in the presence of a milling agent or inorganic solvent and processed to a so-called flaky-shape by a conventional method used in a pigment industry such as a dry ball mill method, wet ball mill method, attrition method, stamp mill method and the like. Thereafter, the metal particles are further subjected to necessary processes such as a classification process, filtering process, mixing process and the like to provide metal particles as a targeted final product.

The milling agent includes, for example, a fatty acid, an aliphatic amine, an aliphatic amide, an aliphatic alcohol and the like, and preferrably, but oleic acid, stearic acid, stearyl amine and the like are used. The present invention, however, is not limited thereto.

Further, an example of inert solvents includes mineral spirits, solvent naphtha, toluene, xylene and the like which can be used singly or as a mixture.

The metal particles suitable for the present invention preferably have a thickness within the range from about 0.01 to 5 microns and a length and/or a width of 1 to about 50 microns.

The surface-treated metal particles of the present invention are those having the surface on which the —COOH group of a fatty acid, the —NH$_2$ group or >NH group of an aliphatic amine, the —CONH$_2$ group of an aliphatic amide, the OH group of an aliphatic alcohol and the like are present. The OH group of aluminium hydroxide exists as a result of being produced or adsorbed thereon by oxidation action of the above milling agent.

Exemplified compound usable in this surface treatment includes, for example, an aliphatic acid such as caproic acid, caprylic acid, capric acid, lauric acid, myristic acid, palmitic acid, stearic acid, behenic acid, oleic acid, linoleic acid, linolenic acid, aliphatic amine such as capryl amine, decyl amine, lauryl amine, myristyl amine, palmityl amine, stearyl amine, oleyl amine, eicocyl amine, 2-ethylhexyl amine, dicapryl amine, didecyl amine, dilauryl amine, dimyristyl amine, dipalmityl amine, distearyl amine, dioleyl amine, dieicocyl amine, 2-ethylhexyl amine and etc., an aliphatic amide such as stearic acid amide, oleic acid amide and etc., an aliphatic alcohol such as lauryl alcohol, tetradecyl alcohol, cetyl alcohol, stearyl alcohol, eicosanol, oleyl alcohol and the like.

With the above functional group existing on the surface of the surface-treated metal particles, the isocyarate are chemically bonded to the metal powder composition according to the present invention. More specifically, for example, the —COOH group is bonded by an amide bond;

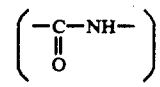

the —NH$_2$ is bonded by a urea bond;

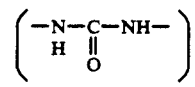

the —OH is bonded by an urethane bond;

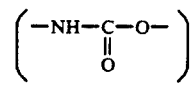

and, the —CONH$_2$ is bonded by a carbonyl urea bond;

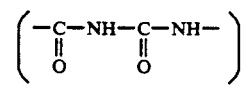

Note that said chemical bond may form three-dimensionally and have a buret structure (sometimes, referred to as a buret crosslinkage) as shown illustratively below because the isocyanate compound exists excessively in the reaction with the —NH$_2$ group. Further, the metal powder composition may have an allophanate as shown illustratively below because the isocyanate compound exists excessively in the reaction with the —OH group.

The buret structure (or crosslinkage) is a chemical bond shown in the following frame.

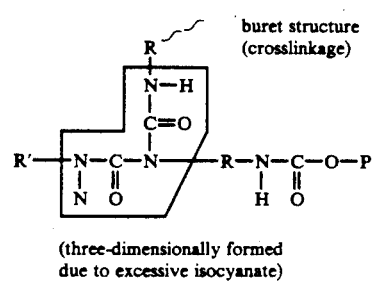

(three-dimensionally formed due to excessive isocyanate)

The allophanate crosslinkage is a chemical bond shown in the following frame.

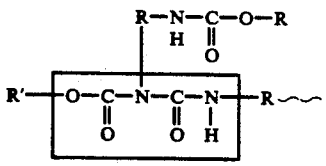

Isocyanate compounds useful for the present invention include a monomer having two or more isocyanate groups in a single molecule and the prepolymer and adduct thereof, and preferably a monomer having two or three isocyanate groups in a single molecule and the prepolymer and adduct thereof. An example thereof includes a diisocyanate monomer such as toluylene diisocyanate, hexamethylene diisocyanate, xylylene diisocyanate, 4,4-diphenyl methane diisocyanate, isophorone diisocyanate, trimethyl hexamethylene diisocyanate, dimeric acid diisocyanate, lysine diisocyanate and etc., a two functional prepolymer thereof (e.g., Duranate D-101, D-102 and etc made by Asahi Kasei Kogyo Co., Ltd.) and a buret type adduct (e.g., Duranate 24A-100 and etc. made by Asahi Kasei Kogyo Co., Ltd.) and etc. Among them, particularly preferable are monomers of hexamethylene diisocyanate, isophorone diisocyanate, xylylene diisocyanate, toluylene diisocyanate, 4,4-diphenyl methane diisocyanate, and they can be used singly or as a mixture of two or more.

Next, phosphorus compounds useful for the present invention include inorganic phosphoric acids and acidic organic phosphoric acid ester compounds containing the group shown in the formula (I).

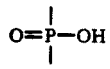 (I)

An example of inorganic phosphoric acids includes orthophosphoric acid, pyrophosphoric acid, triphosphoric acid, tetra-phosphoric acid, and phosphorous acid and the like. Further, an acidic organic phosphoric acid ester compound containing the group shown in the formula (I) includes, for example, a compound represented by the following general formula (II) and the salt thereof, and further a phosphoric acid ester compound derived by reacting a compound containing the group shown by the formula (I) in the molecule thereof and etc. They can be used independently or as a mixture of two or more.

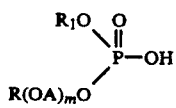 (II)

In formula (II) R represents hydrogen, an alkyl group having 6 to 24 carbon atoms, an alkenyl group having 6 to 24 carbon atoms, or an aryl group having at least one of an alkyl group having 1 to 24 carbon atoms or an alkenyl group having 6–24 carbon atoms as a substituent;

A represents an alkylene group having 2 to 4 carbon atoms;

m represents 0 to 20; and $R_1$ may be the same as or different from R and represents hydrogen, an alkyl group, an alkenyl group, an aryl group or R(OA)m (where R, A and m are shown above).

An example of the alkyl group and alkenyl group in R and $R_1$ is preferably octyl, decyl, tridecyl, lauryl, cetyl, stearyl, oleyl, hexadecyl and the like.

Further, an example of aryl group in R and $R_1$ is preferably octyl phenyl, nonyl phenyl, dodecyl phenyl, dinonyl phenyl, p-tert-butyl phenyl, p-tert-amyl phenyl, and the like.

Further, A is preferably ethylene, propylene, and the like.

An illustrative compound is preferably an alkyl, an alkenyl or an aryl phosphate or a phosphate of ethyleneoxide adduct to an alkyl group, an alkenyl group or an aryl group. Note that the phosphate may be either of mono-ester or di-ester, or a mixture thereof, or a mixture of different phosphates. Further, a tri-ester or a tri-salt of phosphoric acid having a functional group capable of producing an acidic hydroxyl group due to dissociation during the treating process of the metal particles, even if the acidic hydroxyl group does not exist originally or a phosphorous compound capable of reacting with an isocyanate group such as an amino group, carboxylic group or the like can be used.

Usually, the above phosphorous compounds are reacted with an isocyanate group of the isocyanate compound after the isocyanate compound is chemically bonded to various functional groups existing on the surface of metal particles, or the isocyanate compound is previously reacted with the phosphorus compound and then reacted with the various functional groups.

Although the combination of the functional groups existing on the surface of the surface-treated metal particles, the isocyanate compound and phosphorous compound may be selected, taking a reaction speed into consideration. An example of a preferable combination is the combination of a primary amino-group, a diisocyanate compound and an acidic phosphoric acid ester compound, the combination of an alcohol group, a diisocyanate compound and an acidic phosphoric acid ester compound, and the like. At this time, the primary amino group is introduced from an aliphatic amine such as stearyl amine and etc. and the alcohol group is introduced from an aliphatic alcohol such as stearyl alcohol and etc. Toluylene diisocyanate, hexamethylene diisocyanate and etc. can be used as the diisocyanate compound. Octyl acid phosphate, tridecyl acid phosphate, nonyl phenyl phosphate, p-tert-amylphenyl acid phosphate and the like can be used as the acidic phosphoric acid ester compound.

In the metal powder composition according to the present invention, the above acid OH group bonded to phosphorous is bonded to the above isocyanate compound through an urethane bonding.

As described above, the composite metal powder composition having the phosphorus compound which i difficult to be removed therefrom even if subjected to a mechanical shearing can be obtained by fixing the phosphoric compound on the surface of the surface-treated metal particles by the chemical bond through the specific isocyanate compound which reacts with both the surface of the surface-treated metal particles and the phosphoric compound. This composite metal powder composition not only has an excellent storage stability as a metal pigment for an aqueous paint but also exhibits an excellent coating performance when used in an aqueous paint as a metal pigment.

As written above, the storage stability described here means both the anti-erosiveness of a metal powder pigment in an aqueous paint and the stability of the metal powder pigment when the metal powder pigment is singly stored.

It is supposed that the coating mechanism between the metal pigment of the present invention which is coated on a metal surface through the chemical bond as described above and a conventional metal pigment is different as follows: According to the study of the applicants, a great improvement of the storage stability is observed when one or a mixture of two or more selected from the acidic organic phosphoric acid ester compounds containing inorganic phosphoric acid and the group shown by the formula (I) is adsorbed on the surface of the metal particles.

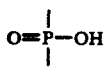

(I)

In particular, when the pH of an aqueous paint is in a weakly acidic range and weakly basic range inclusive a neutral range, the aqueous paint shows a weak erosive activity to a metal powder pigment. Thus the phosphorus compound to be adsorbed on the surface of the metal particles is effective even if a small amount thereof is used, so that an adverse affect of the phosphorus compound on the performance of a formed coating can be sufficiently eliminated.

On the other hand, when the pH of the aqueous paint is in a strongly acidic or basic range, it is effective to increase an amount to be used of the phosphorus compound to be adsorbed on the surface of the metal particles or to select a phosphorus compound having a higher erosion-protective effect. When an additive amount or kind of the phosphorus compound is not suitably selected, however, a satisfactory performance of a coating may not be obtained. More specifically, a deterioration is observed in the performance of the formed coating such as in adhesion, water resistance, hot water-resistance, anti-chipping property and the like.

Although the reason of this phenomenon is not always clear, it is contemplated that an adsorbing force onto the surface of the metal particles may not be sufficiently attained, depending upon the kind of the phosphorus compound used or a repulsing force of the phosphorus compound on the surface of the metal particles increases. Thus, the phosphorus compound is not strongly adsorbed on the surface of the metal particles, depending upon an additive amount of the phosphorus compound. In this case, the phosphorus compound which is not strongly adsorbed on the surface of the metal particles is partially removed by a mechanical shearing in a paint preparation process, circulating process in a coating line, and the like, and exists in a paint as a free substance. Thus, it is supposed that this free substance deteriorates the performance of the coating acting as a defect in the coating. Note that in this specification the strong acidity is in the range of pH 5 or lower and the strong basicity is in the range of pH 9 or higher.

Note that the composite metal powder composition may be any arbitrary commodity form, such as, for example, a powder state substantially containing no volatile substance, a slurry state diluted with a large amount of a volatile substance or a paste state containing a suitable amount of a volatile substance. In general, however, the composite metal powder composition is preferably made in the paste or powder state, taking the workability and the like when a paint is made by using the composition into consideration.

Next, a method of preparing the composite metal powder composition according to the present invention will be described.

The composite metal powder composition according to the present invention can be obtained by adding the isocyanate compound having at least two or more isocyanate groups and the phosphorus compound having at least one or more P—OH group to the above metal particles subjected to a surface treatment in the above inert solvent and causing them to react with the composition.

An additive amount of the phosphorus compound to the metal particles in the present invention must be determined, taking into consideration the characteristics of the metal particles (e.g., erosiveness, specific surface area and the like), the pH of an aqueous paint to be used and the erosion protective ability of the phosphorus compound, and the like, and then must be controlled in a necessarily minimum amount.

The practical additive amount of the phosphorus compound is preferably in the range of 0.2 to 15 parts by weight and more preferably in the range of 0.5 to 10 parts by weight to 100 parts by weight of the metal particles. When the amount of the phosphorus compound is less than 0.2 part by weight, a target storage stability cannot be obtained, whereas when the amount exceeds 15 parts by weight, the coating performance obtained from an aqueous paint using the composite metal powder composition according to the present invention is deteriorated and thus this amount is not preferable.

Further, an additive amount of the isocyanate compound to the metal particles must be determined, taking into consideration the characteristics of the metal particles (e.g., specific surface area and the like) and the characteristics of the phosphorus compound to be used (e.g., moles of functional groups reactive with an isocyanate group, adsorbing property to the metal particles, and the like). The practical additive amount of the isocyanate compound is preferably within the range of 0.1 to 20 parts by weight and more preferably within the range of 0.5 to 10 parts by weight. When the additive amount of the isocyanate compound is less than 0.1 part by weight, the effect of the addition of the isocyanate compound is little exhibited, i.e., the effect for fixing the phosphorus compound on the surface of the metal particles o in the vicinity thereof is little obtained, whereas the additive amount exceeding 20 parts by weight is not preferable because the metal particles are coagulated with each other.

Although a mixing ratio of the above phosphorus compound with the above isocyanate compound must be selected based on the characteristics of the phosphorus compound to be used and the reacting property of the isocyanate compound, the practical mixing ratio is preferably [the isocyanate group of the isocyanate compound]/ [the P—OH group of the phosphorus compound]=0.5/1 to 4/1 (equivalent ratio) and more preferably within the range of 1/1 to 3/1. If this ratio is less than 0.5/1, it is not preferable because the coating performance is deteriorated, whereas when this ratio exceeds 4/1, a storage stability becomes insufficient.

To obtain the composite metal powder composition according to the present invention, the coating of a reaction product may be formed on the surface of the metal particles while 0.1 to 20 parts by weight of the isocyanate compound and 0.2 to 15 parts by weight of the phosphorus compound are individually added to 100 parts by weight of the metal particles in an inert solvent and reacted therein. Atternatively, the coating of the reaction product may be formed on the surface of the metal particles in such a manner that an isocyanate compound is previously reacted with the phosphorus compound and then added thereto. Note that a method of forming the coating of the reaction product is not particularly limited. For example, the coating of such a reaction product may be formed in the milling process of the metal particles or in a reaction vessel by using a slurry having been classified (mixture in a slurry state of an inert solvent and the flaky-shaped metal particles) or a cake obtained by filtering the above slurry. Further, the coating may be formed in a mixer by using the above cake. Preferably, the cake having been filtered is transferred to a reaction vessel with a jacket and reacted in an inert solvent. It is preferable to have a first process for causing the isocyanate compound firstly adsorbed on and reacted with the surface of the metal particles sufficiently dispersed in an inert solvent in the above reaction vessel, and a second process for causing the phosphorus compound to be subsequently added so that the surface of the metal particles is coated with the reaction product between the isocyanate compound and phosphorus compound. Note that when the reaction to which the isocyanate compound is involved is carried out, a catalyst used usually such as, for example, a dibutyl tin dilaurate and the like may be used.

Note, although the concentration of the metal particles in the inert solvent is not particularly limited but must be determined, taking the dispersibility and productivity of the metal particles into consideration, the concentration is 0.5 to 95 wt %, preferably 1.0 to 85 wt % and more preferably 10 to 75 wt %. The concentration of the metal particles in an inorganic solvent exceeding 95 wt % is not preferable because the metal particles are not sufficiently dispersed and thus the surface of the metal particles is not uniformly coated with the reaction product of the isocyanate compound with phosphorus compound, whereas the concentration of less than 0.5 wt % also is not preferable from the view point of productivity.

Although the surface of the composite metal powder composition according to the present invention is coated with the reaction product of an isocyanate compound and a phosphorus compound, the metal particles may exhibit strong acidity in an aqueous dispersion depending upon the additive ratio of the isocyanate compound to the phosphorus compound. In this case, the coagulation of the metal particles can be prevented and further the dispersibility thereof in a paint and the storage stability of the paint can be improved by the addition of a basic substance to the composite metal powder composition to change the property thereof from strong acidity to weak acidity, neutrality or weak basicity.

Note that a base substance usable in the present invention includes an inorganic basic substance such as ammonium, sodium hydroxide, potassium hydroxide and the like and an organic base substance such a diethylamine, dibutylamine, triethylamine, monoethanol amine, diethanol amine, triethanol amine, ethylene diamine, morpholine and the like, and one or a mixture of two or more thereof can be used. The additive amount of the base substance is preferably determined so that the pH of the composite metal powder composition having been added therewith is in the range of 5 to 9, preferably in the range of 6 to 8 and more preferably in the range of 6.5 to 7.5. A pH of less than 5 is not preferable because the metal particles are liable to coagulate with each other, whereas a pH exceeding 9 is also not preferable because the storage stability of the metal particles is deteriorated.

Further, a method of adding the base substance to the composite metal powder composition is not particularly limited and, for example, the base substance may be added to and mixed with the composite metal powder composition in a powder state or the composite metal powder composition dispersed in an inert solvent, or added to and blended with the composite metal powder composition in a paste state.

Further, the addition of a coupling agent to the composite metal powder composition according to the present invention can further improve performance such as, for example, adhesion, water resistance, hot water resistance, chipping resistance and the like of the coating obtained from a paint containing the composite metal powder composition. An example of the coupling agent applicable to the present invention includes a silane coupling agent, a titanate coupling agent, an aluminium coupling agent and the like.

A specific example of the silane coupling agent includes γ-aminopropyl trialkoxysilane, γ-aminoethyl trialkoxy silane, γ-aminobutyl trialkoxysilane, N-β-(aminoethyl)-γ-aminopropyl trialkoxysilane, N-β-(aminoethyl)-γ-aminopropyl alkyl dialkoxysilane, γ-ureidopropyl triethoxysilane, γ-glycidoxy propyl trimethoxysilane, γ-methacryloxy propyl trimethoxy silane, vinyl trialkoxysilane, N-phenyl-γ-amino propyl trimethoxysilane and the like.

Further, an illustrative example of the titanate coupling agents includes isopropyl triisostearoyl titanate, bis(dioctyl pyrophosphate) oxyacetate titanate, isopropyl tridecyl benzene sulfonyl titanate, isopropyl tri(dioctyl pyrophosphate) titanate, bis(dioctyl pyrophosphate) ethylene titarate, isopropyl tri(dioctyl phosphate) titanate, isopropyl tricumyl phenyl titanate, isopropyl (4-aminobenzoyl) isostearoyl titanate, isopropyl 4-aminobenzenesulfonyl di(dodecyl benzenesulfonyl) titanate, isopropyl 4-aminobenzoyl isostearoyloxy acetate titanate, isopropyl tri(N-aminoethyl aminoethyl) titanate, di-1-propoxy.bis(acetyl acetonate) titan and the like.

Further, an illustrative example of the aluminium coupling agent includes acetoalkoxy aluminium diisopropylate, a zircoaluminate compound and the like.

In the present invention, one, or two or more kinds of these coupling agents ca be selected and used. Further, an additive amount of the coupling agent must be determined, taking into consideration the coated film performances of the coating such as, for example, a metallic sheen, adhesion, water resistance, hot water resistance, chipping resistance and the like obtained when the composite metal powder composition added with the coupling agent is used as a pigment compound of a paint. In the present invention, the coupling agent is added in the range of 0 to 20 parts by weight and preferably in the range of 0.5 to 10 parts by weight to 100 parts by weight of the metal powder (as the metal powder the surface of which is not subjected to a surface treatment) in the composite metal powder composition. The additive amount of the coupling agent exceeding 20 parts by weight is not preferable because the metallic sheen (metal-like feeling) of the coating made by using this composite metal powder composition is deteriorated and further the storage stability thereof also is deteriorated.

The composite metal powder composition according to the present invention can be treated by the coupling agent by making use of the hydrolysis reaction of the coupling agent. The amount of water needed by this reaction is in the range of 10 to 100 parts by weight and preferably in the range of 20 to 70 parts by weight to 100 parts by weight of the coupling agent. When the amount of water is less than 10 parts by weight, the hydrolysis reaction is not sufficiently effected, whereas when the amount exceeds 100 parts by weight, a free condensation product is produced due to the hydrolysis reaction and made to a cohesive substance which deteriorates the appearance of a coating, and thus this amount is not preferable. Note that a method of adding the coupling agent to the composite metal powder composition is not particularly limited and, for example, the coupling agent may be added to and mixed with the composite metal powder composition dispersed in an inert solvent, added to and blended with the composite metal powder composition in a paste state or added to and mixed with the composite metal powder composition in a powder state.

The metallic paint according to the present invention is composed of at least (a) 100 parts by weight of a paint resin and (b) 0.1 to 100 parts by weight of the composite metal powder composition, and a dilution agent and other paint additive agents may be added, if necessary. Although the composite metal powder composition according to the present invention exhibits a very excellent storage stability and a coating performance equal or superior to a solvent type paint as a metal pigment for an aqueous paint, the composition can be of course be used as a pigment for a solvent type paint.

Any arbitrary resins conventionally used as a metallic paint resin can be of course used as the above paint resin and further resins which have not been conventionally used because they have a large amount of functional groups reactive with a metal pigment can also be used as the above paint resin, which is supposed to result from the effect of the reaction product of the isocyanate compound with the phosphorus compound coating the surface of the metal powder of the composite metal powder composition according to the present invention.

These resins include an acrylic resin, an alkyd resin, an oil-free alkyd resin, a polyvinyl chrolide resin, an urethane resin, a melamine resin, a polyester resin, a urea resin, a cellulose resin, an epoxy resin and the like. and may be used singly or as a mixture of two or more thereof. The amount of the composite metal powder composition according to the present invention used in a metallic paint is in the range from 0.1 to 100 parts by weight to 100 parts by weight of a paint resin.

The amount of the composite metal powder composition of less than 0.1 parts by weight is not practical because a sheen necessary for a metallic paint cannot be obtained, whereas when the amount exceeds 100 parts by weight, not only workability in coating work is deteriorated because the paint becomes excessively viscous but also only a poor coating performance can be obtained.

A thinner for dilution used in the metallic paint according to the present invention includes usual organic solvents used in the field of paints, such as, for example, an aromatic compound such as toluene, xylene and etc., an aliphatic compound such as hexane, heptane, octane and etc., alcohols such as ethanol, butanol, propanol, isopropanol and etc., esters such as ethyl acetate, butyl acetate and etc., ketones such as methyl ethyl ketone, methyl isobutyl ketone and the like, a chlorine compound such as trichloroethylene and the like, and cellosolve such as ethylene glycol monoethylether and the like. Although one, or two or more of them are used, a mixture of two or more is preferably used. A composition of the thinner for dilution may be determined, taking solubility of a paint resin, coating forming performance, workability in a coating work and the like into consideration.

Note that additives such as a pigment, dye, wetting agent, dispersing agent, anti-color separating agent, leveling agent, slip agent, anti-film forming agent, antigelatinization agent, defoaming agent and the like usually used in the field of paints may be added to the metallic paint according to the present invention.

Further, an aqueous metallic paint containing the composite metal powder composition according to the present invention is made into the paint by using a paint making technology usually employed in this field and composed of the composite metal powder composition according to the present invention and an aqueous paint resin as an essential component with or without the addition of various additives needed depending upon objects and applications and organic or inorganic pigments other than the above composite metal powder composition.

Here, the aqueous paint resin includes water soluble resins or water dispersing resins and these resins may be used independently or as a mixture. The different kinds of aqueous paint resins have an infinite variety depending upon the objects and applications thereof and are not particularly limited. In general, however, the aqueous paint resin includes acrylic type, acryl-melamine type, polyester type and polyurethane type aqueous paint resins and the like, and the acryl-melamine resin is most widely used among them. Further, the various kinds of the above additives include substances usually used in this field such as, for example, a dispersing agent, leveling agent, thixotropy giving agent, viscosity increasing agent, antidripping agent, moldproofing agent, UV-absorber, film forming assisting agent, surface active agent, other organic solvents, water and the like so long as these substances and the amount thereof do not deteriorate the effect of the present invention.

Further, the above inorganic and organic pigments are preferably selected from inorganic pigments such as titanium white, zinc white, Prussian blue, iron oxide, calcium carbonate, cadmium yellow, cadmium red, ultramarine blue, barium sulphate, lead sulphate, calcium silicate, cobalt violet, manganese violet, pearl mica, pearl essence and the like and organic pigments such as vat organic pigment, isoindolinone type organic pigment, quinacrydone organic pigment, condensed azo type organic pigment, nonsoluble azo pigment type organic pigment, copper phthalocyanine type organic pigment, threne type organic pigment, basic dyeing lake type organic pigment and etc. and carbon black, graphite and the like in accordance with the objects and applications thereof. It is of course needless to say that the kinds and amounts thereof must be properly selected so as not to deteriorate the effect of the invention.

EXAMPLES

The present invention will be described in more detail with reference to examples. Note, although infinite combinations of embodiments of the present invention can be contemplated, several kinds of typical embodiments among them will be described below with reference to examples. Therefore, the present invention is not limited only to the following examples.

First, test methods and measuring method used here will be described.

I. Characteristics of composite Metal Powder Composition

(1) Storage Stability

The storage stability of the composite metal powder composition was evaluated under accelerated conditions. More specifically, a specimen of the composite metal powder composition in the amount of about 100 g was charged into a tin of 300 ml and covered with a lid and then left in a hot air circulating type dryer at 50° C. for seven days. Thereafter, the above specimen in the amount of 50 g was dispersed into one liter of mineral spirit, then poured into a filtration tester (manufactured by Millipore Ltd.) provided with a nylon filter of 200 meshes, further sufficiently washed with mineral spirit and acetone, and then the residue thereof obtained after filtration was collected and weighed after being dried. This weight was divided by the weight of the non-volatile content in the specimen and represented by percentage, and the resulting stability of the specimen was evaluated according to the following table.

| | |
|---|---|
| 0.02% or less | ⊚ |
| 0.02–0.05% or less | ○ |
| 0.05–0.10% or less | △ |
| exceeding 0.10% | X |

(2) Water Stability 20 g of the composite metal powder composition (assuming that a metal content=65%) was collected in a conical flask of 200 ml, 0.8 g of a nonionic surface active agent and 100 ml of pure water were added thereto and then the flask was strongly shaken to sufficiently disperse the specimen. Then, a measuring pipette with a rubber stopper was attached to the neck of the flask and the amount of gas generated was measured from the graduations of measuring pipette after the flask had been dipped into a constant temperature water bath at 60° and left therein for 24 hours. The specimen was evaluated as follows in accordance with the amount of gas generated.

| | |
|---|---|
| 0.5 cc/g or less | ⊚ |
| 0.5–2.0 cc/g or less | ○ |
| 2.0–5.0 cc/g or less | △ |
| exceeding 5.0 cc/g | X |

II. Characteristics of Paint and Coating

A water paint was prepared in accordance with the following blend and (1) the storage stability of the paint, (2) appearance of the coated film, (3) adhesion of the coated film, (4) hot water resistance of the coated film were evaluated.

| | |
|---|---|
| sample composite metal powder composition (metal content = w %) | 2821/w parts by weight |
| water soluble acrylic resin (non-volatile content = 50%) *1 | 370 parts by weight |
| water soluble melamine resin (non-volatile content = 50%) *2 | 100 parts by weight |
| pure water | 491 parts by weight |
| Total | 2821/w + 961 |

(Note) *1 ALMATEX WA-911 (manufactured by Mitsui Toatsu Chemical Co., Ltd.) added with dimethyl ethanol amine with the pH thereof adjusted to 9.5
*2 Cymel (manufactured by Mitsui Cyanide Co., Ltd.)

(1) Storage Stability of Paint

The above paint in an amount of 100 ml was charged into a conical flask of 200 ml, a measuring pipette with a rubber stopper was attached to the flask and the amount of gas generated was measured after the flask had been left for 10 days at 50° C. Not that the criteria of evaluation was similar to that of the above (2) Water Stability.

(2) Appearance of Coating

The above paint was spray-coated to a degreased/polished steel plate and dried to obtain a coated plate with a film thickness of 15 to 20 microns. The appearance of the coating was visually observed and evaluated. The criteria of evaluation was as follows.

| | color difference $E^{*1)}$ when compared with sample composite metal powder composition (untreated) |
|---|---|
| ⊚ very good | → less than 1 |
| ○ good | → 1 or higher to lower than 2 |
| △ slightly bad | → 2 or higher to lower than 3 |
| X bad | → 3 or higher |

$^{*1)}$measured by a 45°–0° type color difference meter.

(3) Adhesion

The above coated plate was dipped into hot water of 80° C. for one hour, left for 8 hours at a room temperature, and subjected to a cross-cut adhesion test (adhesive tape exfoliation test) and then the exfoliated state of the coating was visually observed and evaluated. The criteria of evaluation was as follows.

| | percentage of adhered coated film |
|---|---|
| ⊚ very bad | → 99% or higher |
| ○ good | → 95% or higher to lower than 99% |
| △ slightly bad | → 90% or higher to lower than 95% |
| X bad | → lower than 90% |

(4) Hot Water Resistance

After the coated plate made in (2) had been dipped into warm water of 40° for ten days, the presence of abnormal conditions such as swelling, shrink, glaze decrease and the like and a metallic feeling were visually observed and evaluated. The criteria of evaluation was as follows.

| Gloss reduction ratio *2) when compared with coated film before being dipped | | Appearance |
| --- | --- | --- |
| ⊚ very good | → less than 3% | no change |
| ○ good | → 3% or higher to lower than 6% | slightly darkened |
| Δ slightly bad | → 6% or higher to lower than 10% | darkened |
| X bad | → 10% or higher | very darkened |

*2) measurement of gloss of 60° gloss meter gloss reduction ratio (%) = [gloss ratio (%) before dipping-gloss ratio (%) after dipping] × 100/gloss ratio (%) before dipping

III. Preparation of Sample Metal Powder Composition

REFERENCE EXAMPLE 1

Preparation of Sample Aluminium Powder Composition

42 Kg of steel balls having a diameter of 8.9 mm, 1.4 Kg of aluminium atomized powder VA-500 (manufactured by Yamaishi Metal Co., Ltd.), 1.7 liters of mineral spirit and 10 g of stearyl amine were charged into a ball mill having an inside diameter of 34.5 cm and a length of 38.4 cm and the ball mill was rotated for 3 hours at 60 rpm, 2.8 liters of mineral spirit was added and the ball mill was further rotated for one hour and 10 minutes, and then the milled aluminium slurry was washed with the mineral spirit, taken out, and sieved with a Dalton vibration sieve provided with a stainless steel net with a mesh size of 40 microns (manufactured by Sanei Seisakusho Co., Ltd., Model 402) to sieve an under sized slurry and obtain a flaky-shaped aluminium powder composition having a metal content of 74.0 wt %.

REFERENCE EXAMPLE 2

Preparation of Sample Zinc Powder Composition

After use of an attritor (manufactured by Mitsui Miike Seisakusho, Model MA-1SD, tank capacity: 4.9 liters) charged with 200 g of particle-shaped zinc powder (characteristic particle number d': 45 microns), 5.0 g of oleic acid, 200 ml of mineral spirit and 15 Kg of steel balls having a diameter of 5 mm and rotated for 16 hours at 200 rpm to mill the zinc powder, flaky-shaped zinc powder milled by using the mineral spirit was taken out, separated and filtered from the mineral spirit to obtain a sample flaky-shaped sample zinc powder composition having a metal content of 60.1 wt %.

REFERENCE EXAMPLE 3

Preparation of Sample Copper Powder Composition

After an attritor charged with 200 g of particle-shaped copper powder (characteristic particle number d': 50 microns), 5.0 g of stearic acid, 200 ml of mineral spirit and 15 Kg of steel balls having a diameter of 5 mm had been rotated for 32 hours at 200 rpm in the same way as that of Reference Example 2, a sample flaky-shaped zinc powder composition having a metal content of 76.0 wt % was obtained by taking out and separating with the use of mineral spirit.

REFERENCE EXAMPLE 4

Preparation of Sample Brass Powder Composition

After a copper ball mill (capacity: 25 liters, inside diameter: 300 mm, length: 350 mm) charged with 850 g of particle-shaped brass (weight ratio of copper to zinc: 1/1) powder (characteristic particle number d': 50 microns), 5.0 g of stearyl amine, 700 ml of mineral spirit and 35 Kg of steel balls having a diameter of 5 mm had been rotated for 40 hours at 58 rpm to mill the brass powder, a flaky-shaped sample brass powder composition having a metal content of 75.0 wt % was obtained by taking out and separating by using the mineral spirit.

EXAMPLE 1

The sample aluminium powder composition obtained in Reference Example 1 in an amount of 100 parts by weight in terms of the metal content and 400 parts by weight of mineral spirit were charged into a separable flask with three necks and the temperature in the system was raised to 70° C. Next, 6 parts by weight of hexamethylene diisocyanate was added and the resultant mixture was continuously stirred for one hour at 70° C. Thereafter, 6 parts by weight of acid tridecyl phosphate AP-13 (manufactured by Daihachi Kagaku Kogyosho Co., Ltd.) was added and reacted for 3 hours. When the amount of the hexamethylene diisocyanate remaining in the solution was measured by gas chromatography (GC), the amount was less than 1 part by weight.

Next, the resultant mixture was filtered through a Büchner funnel and thus a composite aluminium powder composition containing a non-volatile content of 65.2 wt % was obtained.

The above characteristics I and II of the thus obtained composite aluminium powder composition were evaluated and Table 1 shows the result of the evaluation.

EXAMPLES 2-20

A treatment similar to that of Example 1 was carried out by using the sample aluminium powder composition obtained in Reference Example 1 and the kinds and the amounts of the isocyanate compounds and phosphorus compounds are shown in Table 1. The above respective characteristics of the thus obtained composite aluminium powder composition were evaluated and Table 1 shows the result of the evaluation.

EXAMPLES 21 AND 22

The sample aluminium powder composition obtained in Reference Example 1 in an amount of 100 parts by weight in terms of metal content and 400 parts by weight of mineral spirit were charged into a separable flask with three necks and the temperature in the system was raised to 70° C. Next, the isocyanate compounds and the phosphorus compounds shown in Table 1 were added in one lot and the resultant was continuously stirred for 4 hours at 70° C. Next, the resultant was filtered with a Büchner funnel and a composite aluminium powder composition was obtained.

A characteristics evaluation test similar to that of the above was carried out to the thus obtained the composite aluminium powder composition and Table 1 shows the result of the evaluation.

EXAMPLES 23-25

The same treatment as that of Example 1 was carried out except that various kinds of sample metal powder compositions obtained in Reference Examples 2-4 were used in place of the sample aluminium powder composition obtained in Reference Example 1 to obtain various kinds of composite metal powder compositions. The respective characteristics of the thus obtained various kinds of composite metal powder compositions were evaluated and Table 2 shows the result of the evaluation.

EXAMPLE 26

The sample aluminium powder composition obtained in Reference Example 1 in an amount of 100 parts by weight in terms of the metal content and 400 parts by weight of mineral spirit were charged into a separable flask with three necks and the temperature in the system was raised to 70° C. Next, 6 parts by weight of hexamethylene diisocyanate was added and the resultant was continuously stirred for one hour at 70° C. Thereafter, 6 parts by weight of acid tridecyl phosphate AP-1 (manufactured by Daihachi Kagaku Kogyosho Co., Ltd.) was added thereto and reacted for 3 hours. Next, 0.8 part by weight of dibutyl amine was added and stirred for 15 minutes and then the resultant was filtered with a Büchner funnel and thus a composite aluminium powder composition containing a non-volatile content of 67.0 wt % was obtained.

A characteristics test similar to that of the above was carried out to the thus obtained composite aluminium powder composition and Table 3 shows the result of the evaluation.

EXAMPLE 29

A treatment similar to that of Example 26 was carried out by using the isocyanate compounds, phosphorus compounds and base substances shown in Table 3. The various characteristics of the thus obtained composite aluminium powder compositions were evaluated and Table 3 shows the result of the evaluation.

EXAMPLE 30

The sample aluminium powder composition obtained in Reference Example 1 in an amount of 100 parts by weight in terms of the metal content and 400 parts by weight of mineral spirit were charged into a separable flask with three necks and the temperature in the system was raised to 70° C. Next, 6 parts by weight of hexamethylene diisocyanate was added and the resultant was continuously stirred for one hour at 70° C. Thereafter, 6 parts by weight of acid tridecyl phosphate AP-13 (manufactured by Daihachi Kagaku Kogyosho Co., Ltd.) was added and reacted for 3 hours.

Next, 5 part by weight of N-$\beta$(aminoethyl)-$\gamma$-aminopropyl methyl dimethoxy silane KBM-602 (manufactured by Shinetsu Kagaku Kogyo Co., Ltd.) and 3 parts by weight of water were added and stirred for 1.5 hours and then the resultant was filtered with a Büchner funnel and thus a composite aluminium powder composition containing a non-volatile content of 66.5 wt % was obtained. The characteristics of the thus obtained composite aluminium powder composition were evaluated in the same way as the above and Table 4 shows the result of the evaluation.

EXAMPLES 31-37

A treatment similar to that of Example 30 was carried out by using the sample aluminium powder composition obtained in Reference Example 1 and the kinds and the amounts of the isocyanate compounds, phosphorus compounds, coupling agents and water shown in Table 4. The respective characteristics of the thus obtained composite aluminium powder composition were evaluated and Table 4 shows the result of the evaluation.

REFERENCE EXAMPLE 1

The water dispersing metal powder composition disclosed in Japanese Patent Kokoku No. Sho 60 (1985)-8057 was prepared as follows.

6 parts by weight of tridecyl acid phosphate AP-13 and 3 parts by weight of a nonionic surface active agent were added to and mixed with the sample aluminium powder composition obtained in Reference Example 1 in an amount of 100 parts by weight in terms of the metal content and then water was added thereto so that a water dispersing aluminium paste having a non-volatile content of 65 wt % was prepared.

The above characteristics I and II of the thus obtained water dispersing aluminium paste (non-volatile content: 65.9 wt %) and Table 1 shows the result of the evaluation.

REFERENCE EXAMPLE 2

A blend of the anti-foaming agent for a coating composition disclosed in Japanese Patent Kokai No. Sho 61 (1986)-47771 was applied to metal particles.

More specifically, the reaction product obtained by adding 2 parts by weight (0.05 equivalent) of 85% orthophosphoric acid to 10 parts by weight of an epoxy resin "AER-331L" was diluted with 30 parts by weight of 2-butoxyethanol and further the pH thereof was adjusted to 7.6 by triethyl amine to provide a neutralized solution of a reactant.

The above neutralized solution of the reactant was added to and mixed with the sample aluminium powder composition obtained in Reference Example 1 in an amount of 100 parts by weight in terms of the metal content to obtain aluminium powder in a paste state having a non-volatile content of 66.0 wt %.

The above characteristics I and II of the thus obtained aluminium powder in the paste state were evaluated and Table 1 shows the result of the evaluation.

TABLE 1

| | Sample Metal Composition | | Equivalent Ratio of Isocyanate Group and P—OH Group | Coating Material etc. | | | | | Non-volatile Content | Performance of Uncomposite Metal Powder | | Performance of Paint and Coating | | | |
|---|---|---|---|---|---|---|---|---|---|---|---|---|---|---|---|
| | | | | Isocyanate Compound | | Phosphorus Compound | | Method of Addition | | | | | | | |
| | Kind of Metal | Metal Content | | Kind | Amount | Kind | Amount | | | Storage Stability | Water Stability | Storage Stability | Appearance of Coating | Adhesion | Hot Water Resistance |
| Example 1 | Aluminium | Reference Example 1 100 Parts by Weight | 2.9/1 | HMDI | 6 Parts by Weight | AP-13 | 6 Parts by Weight | 2 Steps | 65.2 wt % | ⊙ | ⊙ | ⊙ | ⊙ | ⊙ | ⊙ |
| Example 2 | Aluminium | Reference Example 1 100 Parts by Weight | 0.6/1 | " | 1.2 | " | 6 Parts by Weight 7.7 | " | 66.5 | ⊙ | ⊙ | ⊙ | ⊙ | ⊙ | ○ |
| Example 3 | Aluminium | Reference Example 1 100 Parts by Weight | 3.8/1 | " | 10 | " | 1.7 | " | 65.1 | ○ | ⊙ | ○ | ⊙ | ⊙ | ⊙ |
| Example 4 | Aluminium | Reference Example 1 100 Parts by Weight | 3.5/1 | " | 2 | " | 1.7 | " | 66.3 | ⊙ | ⊙ | ○ | ⊙ | ⊙ | ⊙ |
| Example 5 | Aluminium | Reference Example 1 100 Parts by Weight | 3.6/1 | " | 0.3 | " | 0.25 | " | 65.5 | ○ | ○ | ○ | ⊙ | ⊙ | ⊙ |
| Example 6 | Aluminium | Reference Example 1 100 Parts by Weight | 0.5/1 | " | 2 | " | 12 | " | 66.7 | ○ | ⊙ | ⊙ | ○ | ○ | ○ |
| Example 8 | Aluminium | Reference Example 1 100 Parts by Weight | 2.1/1 | " | 2.6 | AP-8 | 6 | " | 66.6 | ⊙ | ⊙ | ⊙ | ⊙ | ⊙ | ⊙ |
| Example 9 | Aluminium | Reference Example 1 100 Parts by Weight | 2.3/1 | " | 3 | RE-410 | " | " | 65.5 | ⊙ | ⊙ | ⊙ | ⊙ | ⊙ | ⊙ |
| Example 10 | Aluminium | Reference Example 1 100 Parts by Weight | 1.6/1 | " | " | RS-410 | " | " | 66.4 | ⊙ | ⊙ | ⊙ | ⊙ | ⊙ | ⊙ |
| Example 11 | Aluminium | Reference Example 1 100 Parts by Weight | 1.2/1 | " | 6 | Ortho-phosphoric Acid | 2 | " | 65.2 | ⊙ | ⊙ | ⊙ | ⊙ | ⊙ | ⊙ |
| Example 12 | Aluminium | Reference Example 1 100 Parts by Weight | 2.8/1 | TDI | " | AP-13 | 6 | " | 65.0 | ⊙ | ⊙ | ⊙ | ⊙ | ⊙ | ⊙ |
| Example 13 | Aluminium | Reference Example 1 100 Parts by Weight | 2.0/1 | " | " | AP-8 | " | " | 66.6 | ⊙ | ⊙ | ⊙ | ⊙ | ⊙ | ⊙ |
| Example 14 | Aluminium | Reference Example 1 100 Parts by Weight | 1.5/1 | TDI | 3 | RE-410 | 9 | " | 65.3 | ⊙ | ⊙ | ⊙ | ⊙ | ⊙ | ⊙ |
| Example 15 | Aluminium | Reference Example 1 100 Parts by Weight | 2.0/1 | MDI | 6 | AP-13 | 6 | " | 65.2 | ⊙ | ⊙ | ⊙ | ⊙ | ⊙ | ⊙ |
| Example 16 | Aluminium | Reference Example 1 100 Parts by Weight | 2.6/1 | XDI | " | " | " | " | 66.9 | ⊙ | ⊙ | ⊙ | ⊙ | ⊙ | ⊙ |

TABLE 1-continued

| | Sample Metal Composition | | Coating Material etc. | | | | | | | Performance of Uncomposed Composite Metal Powder | | | Performance of Paint and Coating | | | |
|---|---|---|---|---|---|---|---|---|---|---|---|---|---|---|---|---|
| | Kind of Metal | Metal Content | Equivalent Ratio of Isocyanate Group and P—OH Group | Isocyanate Compound | | Phosphorus Compound | | Method of Addition | Non-volatile Content | Storage Stability | Water Stability | Storage Stability | Appearance of Coating | Adhesion | Hot Water Resistance |
| | | | | Kind | Amount | Kind | Amount | | | | | | | | |
| Example 17 | Aluminium | Reference Example 1, 100 Parts by Weight | 2.2/1 | IPDI | " | " | " | " | 65.7 | ◉ | ◉ | ◉ | ◉ | ◉ | ◉ |
| Example 18 | Aluminium | Reference Example 1, 100 Parts by Weight | 2.3/1 | LDI | " | " | " | " | 66.0 | ◉ | ◉ | ◉ | ◉ | ◉ | ◉ |
| Example 19 | Aluminium | Reference Example 1, 100 Parts by Weight | 2.4/1 | TMDI | " | " | " | " | 65.7 | ◉ | ◉ | ◉ | ◉ | ◉ | ◉ |
| Example 20 | Aluminium | Reference Example 1, 100 Parts by Weight | 1.1/1 | DDI | 8 | " | " | " | 66.1 | ◉ | ◉ | ◉ | ◉ | ◉ | ◉ |
| Example 21 | Aluminium | Reference Example 1, 100 Parts by Weight | 2.9/1 | HMDI | 6 | AP-13 | " | 1 Step (Added Together) | 66.5 | ○ | ◉ | ○ | ◉ | ◉ | ○ |
| Example 22 | Aluminium | Reference Example 1, 100 Parts by Weight | 2.8/1 | TDI | " | " | " | 1 Step (Added Together) | 65.8 | ○ | ◉ | ○ | ◉ | ◉ | ○ |
| Comparative Example 1 | Aluminium | Reference Example 1, 100 Parts by Weight | 0/1 | — | — | " | 6 | — | 65.9 | △ | ◉ | △ | × | × | × |
| Comparative Example 2 | Aluminium | Reference Example 1, 100 Parts by Weight | 2.9/1 | — | — | Epoxy Resin, Ortho-phosphoric Acid | 10, 2 | — | 66.0 | × | △ | × | △ | △ | × |

TABLE 2

| | Sample Metal Composition | | Equivalent Ratio of Isocyanate Group and P—OH Group | Coating Material etc. | | | | Method of Addition |
|---|---|---|---|---|---|---|---|---|
| | | | | Isocyanate Compound | | Phosphorus Compound | | |
| | Kind of Metal | Metal Content | | Kind | Amount | Kind | Amount | |
| Example 23 | Zinc | Reference Example 2 | 100 Parts by Weight | 2.9/1 | HMDI | 6 Parts by Weight | AP-13 | 6 Parts by Weight | 2 Steps |
| Example 24 | Copper | Reference Example 3 | 100 Parts by Weight | " | " | 6 Parts by Weight | " | 6 Parts by Weight | " |
| Example 25 | Brass | Reference Example 4 | 100 Parts by Weight | " | " | 6 Parts by Weight | " | 6 Parts by Weight | " |

| | Non-volatile Content | Performance of Composite Metal Composition | | Performance of Paint and Coating | | | |
|---|---|---|---|---|---|---|---|
| | | Storage Stability | Water Stability | Storage Stability | Appearance of Coating | Adhesion | Hot Water Resistance |
| Example 23 | 62.3 wt % | ⊚ | ⊚ | ⊚ | ⊚ | ⊚ | ⊚ |
| Example 24 | 69.4 | ⊚ | ⊚ | ⊚ | ⊚ | ⊚ | ⊚ |
| Example 25 | 71.5 | ⊚ | ⊚ | ⊚ | ⊚ | ⊚ | ⊚ |

TABLE 3

| | Sample Metal Composition | | Equivalent Ratio of Isocyanate Group and P—OH Group | Coating Material etc. | | | | Base Substance | |
|---|---|---|---|---|---|---|---|---|---|
| | | | | Isocyanate Compound | | Phosphorus Compound | | | |
| | Kind of Metal | Metal Content | | Kind | Amount | Kind | Amount | Kind | Amount |
| Example 26 | Aluminium | Reference Example 1 | 100 Parts by Weight | 2.9/1 | HMDI | 6 Parts by Weight | AP-13 | 6 Parts by Weight | DBA | 0.6 |
| Example 29 | Aluminium | Reference Example 1 | 100 Parts by Weight | 2.0/1 | TDI | 6 | AP-8 | 6 | Morpholine | 0.3 |

| | Non-volatile Content | Performance of Composite Metal Powder | | Performance of Paint and Coating | | | |
|---|---|---|---|---|---|---|---|
| | | Storage Stability | Water Stability | Storage Stability | Appearance of Coating | Adhesion | Hot Water Resistance |
| Example 26 | 67.0 wt % | ⊚ | ⊚ | ⊚ | ⊚ | ⊚ | ⊚ |
| Example 29 | 64.8 | ⊚ | ⊚ | ⊚ | ⊚ | ⊚ | ⊚ |

TABLE 4

| Example | Sample Metal Composition | | | Equivalent Ratio of Isocyanate Group and P—OH Group | Coating Material etc. | | | | | | | Non-volatile Content | Performance of Composite | | | Performance of Paint and Coat | | | |
|---|---|---|---|---|---|---|---|---|---|---|---|---|---|---|---|---|---|---|---|
| | | | | | Isocyanate | | Phosphorus Compound | | Coupling Agent | | Water | | Metal Powder | | | | | | |
| | Kind of Metal | | Metal Content | | Kind | Amount | Kind | Amount | Kind | Amount | | | Storage Stability | Water Stability | Storage Stability | Appearance of Coating | Adhesion | Hot Water Resistance |
| 30 | Aluminium | Reference Example 1 | 100 Parts by Weight | 0.5/1 | HMDI | 2 Parts by Weight | AP-13 | 12 Parts by Weight | KBM-602 | 5 Parts by Weight | 5 Parts by Weight | 66.5 wt % | ⊚ | ⊚ | ⊚ | ⊚ | ⊚ | ⊚ |
| 31 | Aluminium | Reference Example 1 | 100 Parts by Weight | 0.5/1 | HMDI | 2 Parts by Weight | AP-13 | 12 Parts by Weight | KBM-603 | 5 Parts by Weight | 5 Parts by Weight | 65.0 | ⊚ | ⊚ | ⊚ | ⊚ | ⊚ | ⊚ |
| 32 | Aluminium | Reference Example 1 | 100 Parts by Weight | 0.5/1 | HMDI | 2 Parts by Weight | AP-13 | 12 Parts by Weight | A-1100 | 5 Parts by Weight | 5 Parts by Weight | 65.5 | ⊚ | ⊚ | ⊚ | ⊚ | ⊚ | ⊚ |
| 33 | Aluminium | Reference Example 1 | 100 Parts by Weight | 0.5/1 | HMDI | 2 Parts by Weight | AP-13 | 12 Parts by Weight | A-1160 | 5 Parts by Weight | 5 Parts by Weight | 66.1 | ⊚ | ⊚ | ⊚ | ⊚ | ⊚ | ⊚ |
| 34 | Aluminium | Reference Example 1 | 100 Parts by Weight | 0.5/1 | HMDI | 2 Parts by Weight | AP-13 | 12 Parts by Weight | KBM-403 | 5 Parts by Weight | 5 Parts by Weight | 65.9 | ⊚ | ⊚ | ⊚ | ⊚ | ⊚ | ⊚ |
| 35 | Aluminium | Reference Example 1 | 100 Parts by Weight | 0.5/1 | HMDI | 2 Parts by Weight | AP-13 | 12 Parts by Weight | KBM-573 | 5 Parts by Weight | 5 Parts by Weight | 65.2 | ⊚ | ⊚ | ⊚ | ⊚ | ⊚ | ⊚ |
| 36 | Aluminium | Reference Example 1 | 100 Parts by Weight | 0.5/1 | HMDI | 2 Parts by Weight | AP-13 | 12 Parts by Weight | KR-TTS | 5 Parts by Weight | 5 Parts by Weight | 66.3 | ⊚ | ⊚ | ⊚ | ⊚ | ⊚ | ⊚ |
| 37 | Aluminium | Reference Example 1 | 100 Parts by Weight | 0.5/1 | HMDI | 2 Parts by Weight | AP-13 | 12 Parts by Weight | KR44 | 5 Parts by Weight | 5 Parts by Weight | 65.7 | ⊚ | ⊚ | ⊚ | ⊚ | ⊚ | ⊚ |

Note 1
HMDI: hexamethylene diisocyanate
TDI: toluylene diisocyanate
MDI: 4,4'-diphenyl methane diisocyanate
XDI: xylylene diisocyanate
IPDI: isophorone diisocyanate
LDI: lysine diisocyanate
TMDI: trimethyl hexamethylene diisocyanate
DDI: dimeric acid diisocyanate
Note 2
AP-8: acid octyl phosphate (manufactured by Daihachi Kagaku Kogyo Co., Ltd.)
AP-13: acid tridecyl phosphate (manufactured by Daihachi Kagaku Kogyo Co., Ltd.)
RE-410: polyoxyethylene nonylphenyl phosphate (manufactured by Toho Kagaku Kogyo Co., Ltd.)
RS-410: polyoxyethylene tridecyl phosphate (manufactured by Toho Kagaku Kogyo Co., Ltd.)
Note 3
DBA: dibutyl amine
Note 4
KBM-602: N-β-(aminoethyl)-γ-aminopropyl methyl dimethoxy silane (manufactured by Shinetsu Kagaku Kogyo Co., Ltd.)
KBM-603: N-β-(aminoethyl)-γ-aminopropyl trimethoxy silane (manufactured by Shinetsu Kagaku Kogyo Co., Ltd.)
KBM-403: γ-glycidoxy propyl trimethoxy silane (manufactured by Shinetsu Kagaku Kogyo Co., Ltd.)
KBM-573: N-phenyl-γ-amino propyl trimethoxy silane (manufactured by Shinetsu Kagaku Kogyo Co., Ltd.)
A-1100: γ-amino propyl triethoxy silane (manufactured by Nihon Unicar Co., Ltd.)
A-1160: γ-ureidopropyl triethoxy silane (manufactured by Nihon Unicar Co., Ltd.)
KR-TTS: isopropyl triisostearoyl titanate (manufactured by Ajinomoto Co., Ltd.)
KR-44: isopropyl tri(n-amino ethylamino ethyl) titanate (manufactured by Ajinomoto Co., Ltd.)

INDUSTRIAL APPLICABILITY

The present invention relates to a metal powder composition and a method of manufacturing the same; said metal powder composition has an excellent storage stability in itself, when constructed as discussed above, and provides an excellent storage stability for a paint containing the metal powder composition and in particular for an aqueous paint to which the metal powder composition is applied and further forms a coating having excellent adhesion, water resistance and hot water resistance. Thus, the present invention has a very large, industrial value from the view point of improving the working environment and saving resources.

We claim:

1. A composite metal powder composition, comprising surface-treated metal particles having a treated surface which is further chemically bonded with an isocyanate compound, wherein said isocyanate compound is bonded to a phosphorus compound through urethane bonding.

2. A composite metal powder composition according to claim 1, wherein the equivalent ratio of the isocyanate group(s) of said isocyanate compound to the P—OH group(s) of said phosphorus compound is 0.5/1 to 4/1.

3. A composite metal powder composition according to claim 1, wherein the storage stability of said metal particles is 0.05% or lower and the water stability of said metal particles is 2.0 cc/g or less.

4. A composite metal powder composition according to claim 1, wherein said surface-treated metal particles are aluminum metal powder having an oxidized surface.

5. A composite metal powder composition according to claim 1, wherein said surface-treated metal particles absorb or bond one, or two or more of fatty acids, aliphatic amines, aliphatic amides or aliphatic alcohols on the surface of said surface-treated metal particles.

6. A composite metal powder composition according to claim 1, wherein said metal particles are subjected to a surface treatment with one, or two or more of stearic acid, oleic acid, stearyl amine, stearic acid amide and stearyl alcohol.

7. A composite metal powder composition according to claim 1, wherein the equivalent ratio of the isocyanate group(s) of said isocyanate compound to the P—OH group(s) of said phosphorus compound is 1/1 to 3/1.

8. A composite metal powder composition according to claim 1, wherein said composite metal powder composition is neutralized by a base substance so that a water dispersing solution prepared by using said composition has a pH within a range of 5 to 9.

9. A composite metal powder composition according to claim 1, wherein said composite metal powder composition is further treated with a coupling agent.

10. A composite metal powder composition according to claim 9, wherein said treatment with said coupling agent is carried out by selecting one kind or two or more kinds of a silane coupling agents, titanate coupling agents and aluminum coupling agents to carry out a hydrolysis reaction.

11. A composite metal powder composition according to claim 1, wherein said metal particles are composed of one of aluminum, zinc, copper and brass or an alloy thereof.

12. A method of manufacturing a composite metal powder composition, comprising reacting an isocyanate compound having at least two or more isocyanate groups with surface treated metal particles in an inert solvent and then adding thereto a phosphorus compound having at least one or more P—OH groups to react with the residual isocyanate whereby the surface of said metal particles is coated with the reaction product of said isocyanate compound and said phosphorus compound.

13. A method of manufacturing a composite metal powder composition according to claim 12, wherein said isocyanate compound and said phosphorus compound are added so that the isocyanate groups in said isocyanate compound/the P—OH groups in said phosphorus compound is 0.5/1 to 4/1 in terms of an equivalent ratio.

14. A method of manufacturing a composite metal powder composition according to claim 12, wherein 0.1 to 20 parts by weight of said isocyanate compound and 0.2 to 15 parts by weight of said phosphorus compound are added to 100 parts by weight of said metal particles.

15. A method of manufacturing a composite metal powder composition according to claim 12, wherein said isocyanate compound is one, or two or more selected from toluylene diisocyanate, hexamethylene diisocyanate, xylylene diisocyanate, 4,4-diphenyl methane diisocyanate, isophorone diisocyanate, trimethyl hexamethylene diisocyanate, dimeric acid diisocyanate and lysine diisocyanate.

16. A method of manufacturing a composite metal powder composition according to claim 12, wherein said phosphorus compound is one, or two or more of phosphoric acid ester compounds represented by a formula (II)

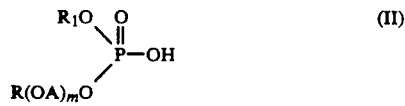

where, R represents hydrogen, an alkyl group having 6 to 24 carbon atoms, an alkenyl group having 6 to 24 carbon atoms, or an aryl group having at least one of an alkyl group having 1 to 24 carbon atoms or an alkenyl group having of 6 to 24 carbon atoms as a substituent;

A represents an alkylene group having 2 to 4 carbon atoms;

m represents 0 to 20; and $R_1$ may be the same as or different from R and represents hydrogen, an alkyl group, an alkenyl group, an aryl group or R(OA)m (where R, A and m are shown above).

17. A method of manufacturing a composite metal powder composition according to claim 12, wherein said phosphorus compound is one or two or more selected from acid octyl phosphate, acid decyl phosphate, acid tridecyl phosphate, acid lauryl phosphate, acid cetyl phosphate, acid stearyl phosphate, acid oleyl phosphate, acid hexadecyl phosphate, acid octyl phenyl phosphate, acid nonyl phenyl phosphate acid dodecyl phenyl phosphate, acid dinonyl phenyl phosphate, acid p-tert-butyl phenyl phosphate, and acid p-tert-amyl phenyl phosphate.

18. A method of manufacturing a composite metal powder composition according to claim 12, wherein said isocyanate compound and said phosphorus compound are added so that the isocyanate group(s) of said isocyanate compound to the P—OH group(s) of said phosphorus compound is 1/1 to 3/1 in terms of an equivalent ratio.

19. A method of manufacturing a composite metal powder composition according to claim 12, wherein 0.5 to 10 parts by weight of said isocyanate compound and 0.5 to 10 parts by weight of said phosphorus compound are added to 100 parts by weight of said metal particles.

20. A method of manufacturing a composite metal powder composition according to claim 12, wherein the step of coating the surface of said metal particles with said reaction product of said isocyanate compound with said phosphorus compound in an inert solvent comprises a first step of treating the surface of said metal particles sufficiently dispersed in said inert solvent with said isocyanate compound and a second step of forming said reaction product of said isocyanate compound with said phosphorus compound on the surface of said metal particles by the addition of said phosphorus compound.

21. A method of manufacturing a composite metal powder composition according to claim 12 comprising, further treating said composite metal powder composition with a coupling agent.

22. A method of manufacturing a composite metal powder composition according to claim 12, wherein said treatment with said coupling agent is carried out by using one, or two or more selected from silane coupling agents, titanate coupling agents and aluminium coupling agents and a hydrolysis reaction is carried out in said treatment.

23. A method of manufacturing a composite metal powder composition according to claim 12, wherein said metal particles are composed of one of aluminium, zinc, copper and brass or an alloy thereof.

* * * * *